(12) United States Patent
Okuyama et al.

(10) Patent No.: US 8,047,084 B2
(45) Date of Patent: Nov. 1, 2011

(54) TORQUE-INDEX SENSOR

(75) Inventors: Ken Okuyama, Hitachi (JP); Yukio Ikeda, Hitachi (JP); Yukitoshi Terasaka, Hitachi (JP); Takahiro Sanada, Kashihara (JP)

(73) Assignee: Hitachi Cable, Ltd., Tokyo (JP)

( * ) Notice: Subject to any disclaimer, the term of this patent is extended or adjusted under 35 U.S.C. 154(b) by 25 days.

(21) Appl. No.: 12/750,082

(22) Filed: Mar. 30, 2010

(65) Prior Publication Data

US 2010/0242627 A1  Sep. 30, 2010

(30) Foreign Application Priority Data

Mar. 31, 2009  (JP) ................................. 2009-086391

(51) Int. Cl.
*G01B 7/30* (2006.01)
*G01L 3/00* (2006.01)

(52) U.S. Cl. ......... 73/862.335; 73/862.331; 73/862.334; 324/207.2; 324/207.25

(58) Field of Classification Search ............. 73/862.331, 73/862.335, 862.334; 324/207.2, 207.25
See application file for complete search history.

(56) References Cited

U.S. PATENT DOCUMENTS

| 6,363,797 | B1 * | 4/2002 | Tokumoto | 73/862.328 |
| 6,513,396 | B2 * | 2/2003 | Nakamura et al. | 73/862.335 |
| 6,543,571 | B2 * | 4/2003 | Tokumoto | 73/862.333 |
| 6,983,664 | B2 * | 1/2006 | Tokumoto | 73/862.329 |
| 7,339,370 | B2 * | 3/2008 | Reimer et al. | 324/207.25 |
| 7,409,878 | B2 * | 8/2008 | Von Beck et al. | 73/862.333 |
| 2003/0062890 | A1 * | 4/2003 | Tokumoto | 324/207.25 |
| 2005/0253578 | A1 * | 11/2005 | Kawashima et al. | 324/207.2 |
| 2011/0080162 | A1 * | 4/2011 | Steinich et al. | 324/207.25 |
| 2011/0126639 | A1 * | 6/2011 | Behrens | 73/862.193 |

FOREIGN PATENT DOCUMENTS

JP  2007-269281  10/2007

* cited by examiner

*Primary Examiner* — Lisa Caputo
*Assistant Examiner* — Jonathan Dunlap
(74) *Attorney, Agent, or Firm* — Brundidge & Stanger, P.C.

(57) ABSTRACT

A torque-index sensor having index sensor and torque sensor closely arranged and integrated therein with lightened interference between them is provided. The invented torque-index sensor is comprised of torque sensor that includes first magnetic sensor arranged beside first annular-shaped magnet and index sensor that includes second magnet arranged beside annular-shaped encoder and second magnetic sensor that are arranged being in-line on common axis; and means for varying magnetic flux, which changes direction of magnetic flux that is generated from second magnet toward first magnetic sensor, positioned between first magnetic sensor in torque sensor and second magnet in index sensor.

6 Claims, 6 Drawing Sheets

SECTIONAL VIEW, SECTIONED ALONG LINE A-A'

DETECTION AXIS
OF SENSOR (b)

TORQUE-INDEX SENSOR

TECHNICAL FIELD

The present invention relates to a torque-index sensor that is an integrated device of a torque sensor for detection of steering torque in steering manipulation and an index sensor for detection of number of turns of a steering shaft, wherein these sensors are installed in a steering system of an automobile for example.

BACKGROUND ART

In a power steering device of which steering motion is assisted by rotational power transmitted from a motor to steering mechanism therein, wherein the rotational power is generated by the motor responding to rotational manipulation applied over steering elements such as a steering handle, it is necessary for driving control of the steering assist motor to detect steering torque applied over the steering elements. For this detection demand, a torque sensor has conventionally been used at an intermediary position on the steering shaft that connects the steering elements and the steering mechanism.

In an electrically-assisted power steering device that uses a torque sensor, detection of the heading of steering control wheel (hereinafter referred to as steering angle) that varies according to manipulation of the steering handle, as well as the steering torque, is required for application of the steering angle to various control scheme of a vehicle.

Conventional arts have employed a mechanical rotational angle sensor for detection of the steering angle. For example, Patent Literature 1 has described a mechanical rotational angle sensor comprised of a pair of gears having different numbers of teeth each from the other, which freely rotate around an axis parallel to the steering shaft being interlocked with the turn of the steering shaft. This sensor detects the steering angle based on the data obtained by means of combining the rotation angles of each of gears of the pair sensed with a magnetic sensor.

In addition to such a mechanical sensor as is described in Patent Literature 1, an index sensor is listed as a means for detecting the number of turns of the steering shaft. The index sensor is a device that generates a reference position of rotation as the steering shaft turns.

Figure 5:
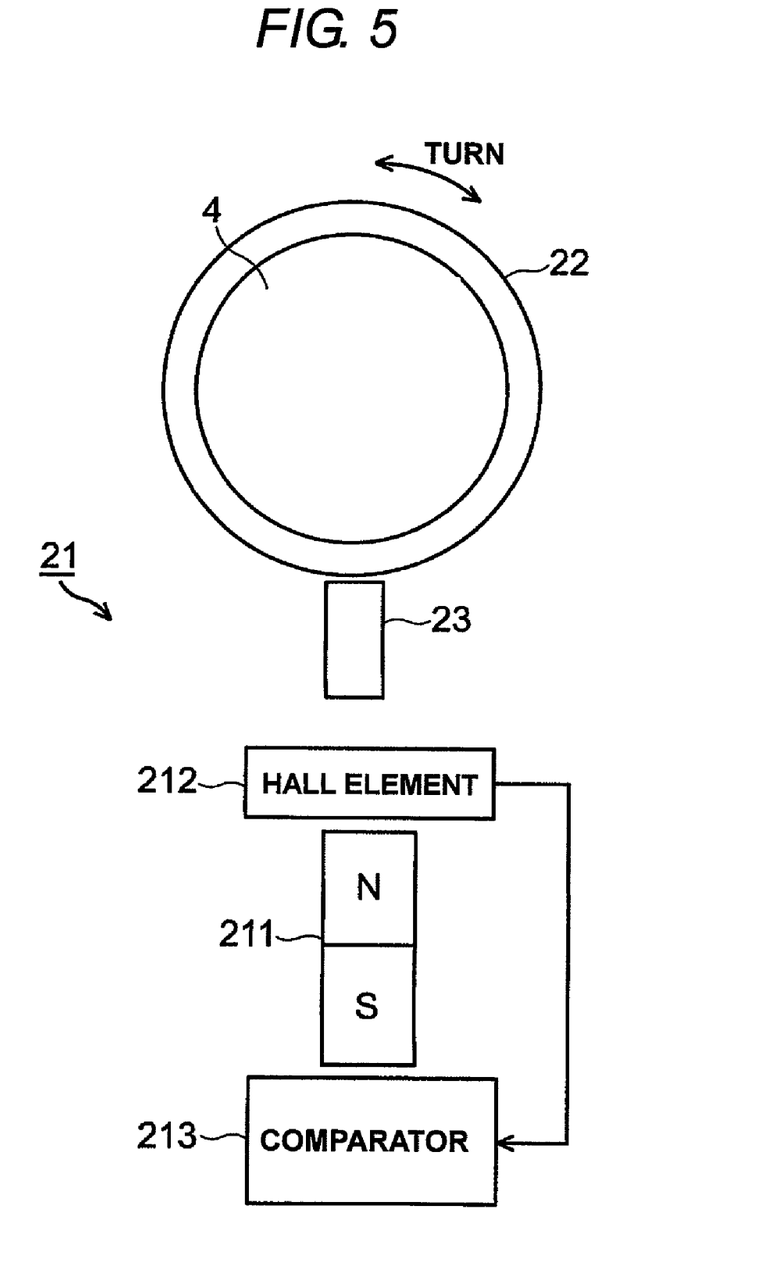
{FIG. 5} This figure shows configuration of a conventional index sensor.

The fundamental configuration of an index sensor will be explained referring to FIG. 5. FIG. 5 is a cross-sectional view of an index sensor installed on a steering shaft (the shaft of a steering handle) viewed in the axial direction of the steering shaft. In the index sensor 21 shown in FIG. 5, a yoke 23 made of a material having high magnetic permeability is installed on a steering shaft 4 sandwiching a collar 22 underneath. Outside of the collar 22, a magnet 211, a Hall element 212 (a magnetic sensor) that detects variation of density of magnetic flux generated from the magnet 211, and a comparator 213 that outputs reference position signal when the detected variation of density of magnetic flux becomes in excess of a predetermined threshold are arranged in line in the direction from the rotational center of the steering shaft 4 toward radially far-side.

Figure 6:
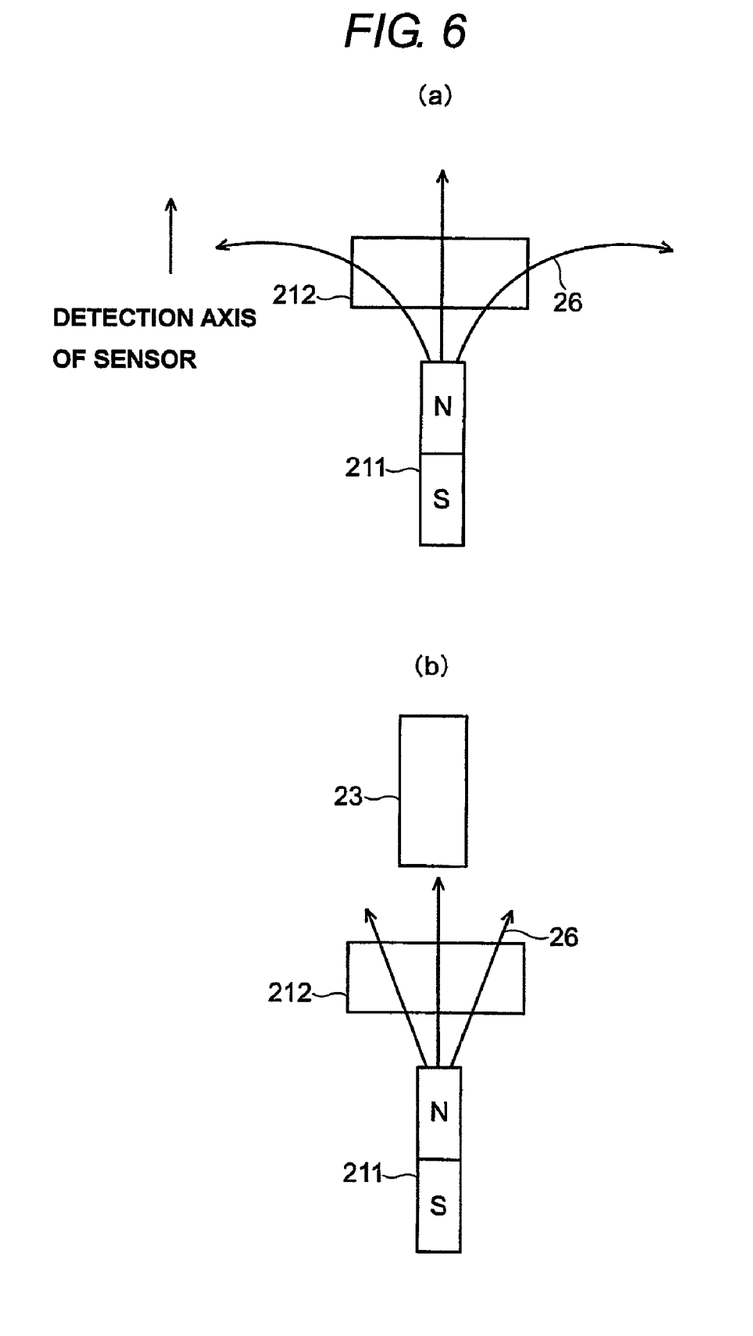
{FIG. 6} This figure shows function of a conventional index sensor.

The function of the index sensor will be explained referring to FIG. 6. In FIG. 6, such a state that the steering manipulation is not applied, i.e. the steering shaft 4 is at the reference position is shown in FIG. 6(*b*) and such a state that the steering shaft 4 is being turned by the steering manipulation is shown in FIG. 6(*a*). In the state shown in FIG. 6(*b*), the yoke 23 is at the position closest to the magnet 211. Since the yoke 23 is made of material having high magnetic permeability, magnetic flux 26 generated from the magnet 211 concentrates into the yoke 23 when its position is the above-stated reference position causing the magnetic flux density that the Hall element 212 will detect to be the maximum.

When the steering manipulation is applied causing the steering shaft 4 to turn, the yoke 23 shifts from the magnetic axis of the magnet 211 as shown in FIG. 6(*a*) with the magnetic flux 26 concentrating on the yoke 23 directed toward the opposite pole of the magnet 211 (S-pole in the figure) resulting in the Hall element 212 detecting reduced magnetic flux density. When the amount of shift of the rotational angle from the reference position becomes large to a certain extent, the flux density that the Hall element 212 detects reduces down to a certain level since the flux 26 concentrating the yoke 23 reduces.

The steering manipulation for changing the wheel traveling direction generally would not end in one turn but will end after plural turns to reach its maximum steering angle. During the course of this steering manipulation process, the magnetic flux 26 generated from the magnet 211 concentrates into the yoke 23 causing the magnetic flux density that the Hall element 212 will detect to be the maximum whenever the steering shaft 4 passes the reference position. As FIG. 5 shows, the index sensor 21 is equipped with the comparator 213 that outputs reference position signal when the detected variation of density of magnetic flux becomes in excess of a predetermined threshold. Therefore, the reference position signal is generated from the comparator 213 whenever the steering shaft 4 passes the reference position causing the magnetic flux density that the Hall element 212 will detect to exceed the predetermined threshold. That is; the number of turns of the steering shaft 4 can be detected by sensing the pass of the yoke 23 over the reference position by the index sensor 21 and by counting the number of passes over the reference position, wherein the yoke 23 is installed on the steering shaft 4 sandwiching the collar 22 underneath.

Usually, a power steering device is equipped with a motor for steering assist. Although rotation angle of this motor provides steering angle information, the information by the rotation angle of this motor is limited to the range of 0° to 360°. This means that the obtained information is relative value of angles; the absolute value of steering angle cannot be obtained from that. However, combining the information of number of turns of the steering shaft obtained by the index sensor with the information of relative value of angles obtained form the steering assist motor makes it possible to accurately find the absolute value of the steering angle caused by the steering manipulation.

Thus, the use of an index sensor enables to detect the steering angle without using such a mechanical rotational angle sensor as described in Patent Literature 1. This feature offers advantages such as reduction of number of constituent parts, simplification of fabrication process, cutting of manufacturing cost, and miniaturization of device.

{Patent Literature 1}
Japanese Patent Application Laid-Open No. 2007-269281

SUMMARY OF INVENTION

As stated above, incorporating an index sensor into a power steering device offers many advantages; however, the sensor invites disadvantages due to its inherent configuration.

As shown in FIGS. 5 and 6, the index sensor is arranged so that the number of turns of the steering shaft can be detected relying on the variation of magnetic flux density caused from the change in direction of the magnetic flux generated from a magnet. This means therefore, the index sensor always generates magnetic flux in certain direction. In this configuration, a torque sensor, which is an essential element in power steering devices for detecting steering torque, senses variation in the magnetic flux appeared within the torque sensor due to the turn of the steering shaft and detects the steering torque responding to the magnitude of the variation of the magnetic flux, as stated in Patent Literature 1. Since the torque sensor uses variation of the magnetic flux for torque detection as stated above, the magnetic flux generated from the index sensor interferes, if the index sensor is arranged close to the torque sensor, in the working order of the torque sensor inviting such a problem that the detection error of the torque sensor will increase.

For prevention of occurrence of this sort of problem, it may be an idea to make the torque sensor and the index sensor separate bodies and to arrange them in positions where they do not interfere with each other. In such arrangement however, the manufacturing of the power steering device requires the fabrication processes of the torque sensor and the index sensor to be separately performed, which results in a poor production efficiency.

The present invention has been made in consideration of above-stated problems aiming to provide an integrated torque-index sensor, in which the magnetic interference by the index sensor with the torque sensor is reduced to permit an efficient fabrication of an index sensor, which is able to bring advantages of reduction of number of parts, simplification of fabrication process, cutting of manufacturing cost, and miniaturization of the device, into a power steering device.

Means for Solving the Problems

In view of above-stated problem, the present invention provides a torque-index sensor, comprising: a torque sensor that includes a first magnetic sensor arranged beside a first annular-shaped magnet, and an index sensor that includes a second magnet, and a second magnetic sensor both arranged beside an annular-shaped encoder, wherein the torque sensor and the index sensor are arranged in line on a common axis; and a means for varying magnetic flux, which changes direction of magnetic flux that is generated from the second magnet toward the first magnetic sensor, arranged between the first magnetic sensor in the torque sensor and the second magnet in the index sensor.

Further, the present invention provides the torque-index sensor, wherein the means for varying magnetic flux is a plate-shaped member made of magnetic material.

Still further, the present invention provides the torque-index sensor, wherein the means for varying magnetic flux is a plate-shaped member made of magnetic material of which relative magnetic permeability is not smaller than 1000.

Still more, the present invention provides the torque-index sensor, wherein the distance between the second magnet and the means for varying magnetic flux is within the range of 2.0 mm±0.5 mm.

The present invention reduces the interference with the torque sensor attributable to the magnetic flux generated from the index sensor. Therefore, a close arrangement of the index sensor to the torque sensor becomes practicable permitting obtaining a torque-index sensor, an integrated device of an index sensor with a torque sensor. The torque-index sensor by the present invention enables fabrication of the index sensor and the torque sensor integrally into the power steering device. This therefore permits an efficient fabrication of an index sensor, which is able to bring advantages of reduction of number of parts, simplification of fabrication process, cutting of manufacturing cost, and miniaturization of the device, into a power steering device.

DESCRIPTION OF EMBODIMENTS

Modes of implementing the present invention will be explained hereunder referring to drawings.

Figure 1:
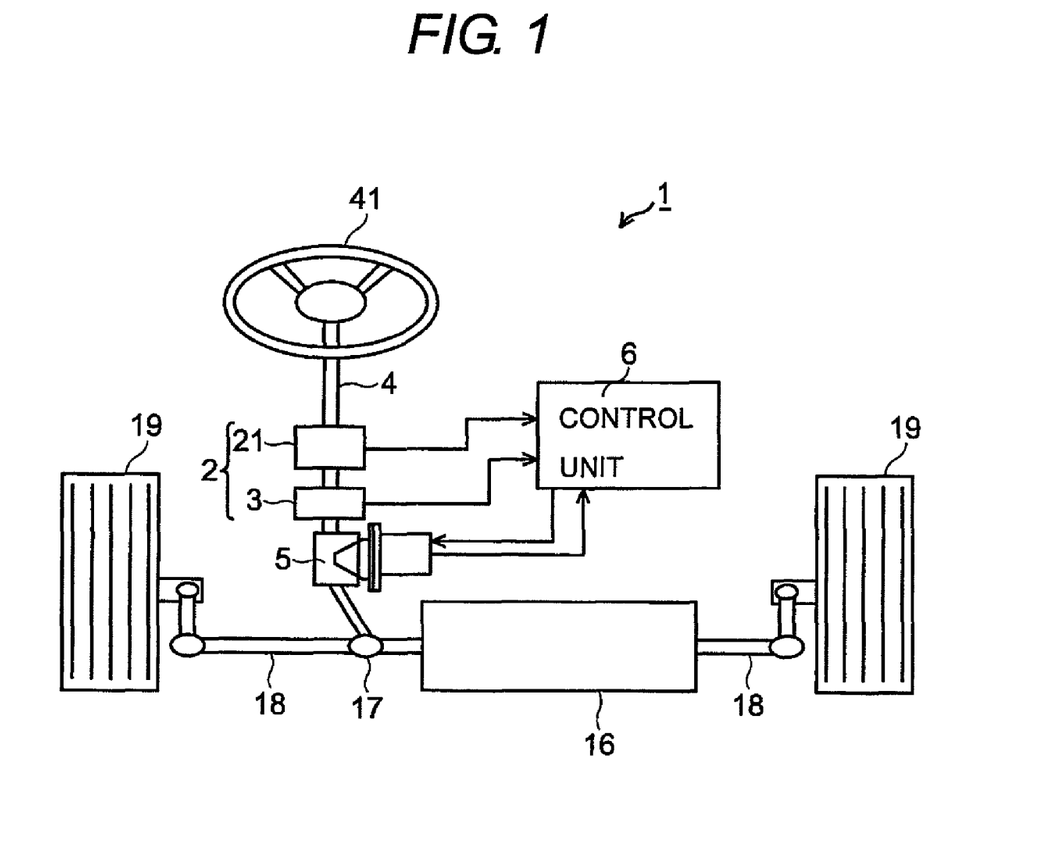
{FIG. 1} This figure shows configuration of a power steering device by the present invention.

FIG. 1 shows a configuration of the power steering device equipped with a torque-index sensor by the present invention. In the power steering device shown in FIG. 1, the steering manipulation is performed by turning a steering handle 41. Turning the steering handle 41 causes a steering shaft 4, which engages with the steering handle 41 at its center, to turn together with the steering handle 41. On the other end of the steering shaft 4, a pinion 17 is installed and a rack 18 that engages with the pinion 17 is provided. The rack 18 is movably supported inside a rack housing 16. At both ends of the rack 18 protruding from the rack housing 16, wheels 19 are connected via links.

With this configuration, the steerage is performed in a manner such that: the turn of the steering handle 41 is transmitted to the steering shaft 4; as the steering shaft 4 turns, the pinion 17 rotates causing the rack 18 provided engaging with the pinion 17 to shift longitudinally along its axis; and the shift of the rack 18 in its axial direction causes the wheels 19, which are connected to both ends of the rack 18, to turn their heading.

In this configuration, a torque-index sensor 2, into which an index sensor 21 and a torque sensor 3 are integrated, and a motor 5 for assisting steerage are provided on the steering shaft 4 to assist the steerage responding to the turn of the steering handle 41.

Figure 2:
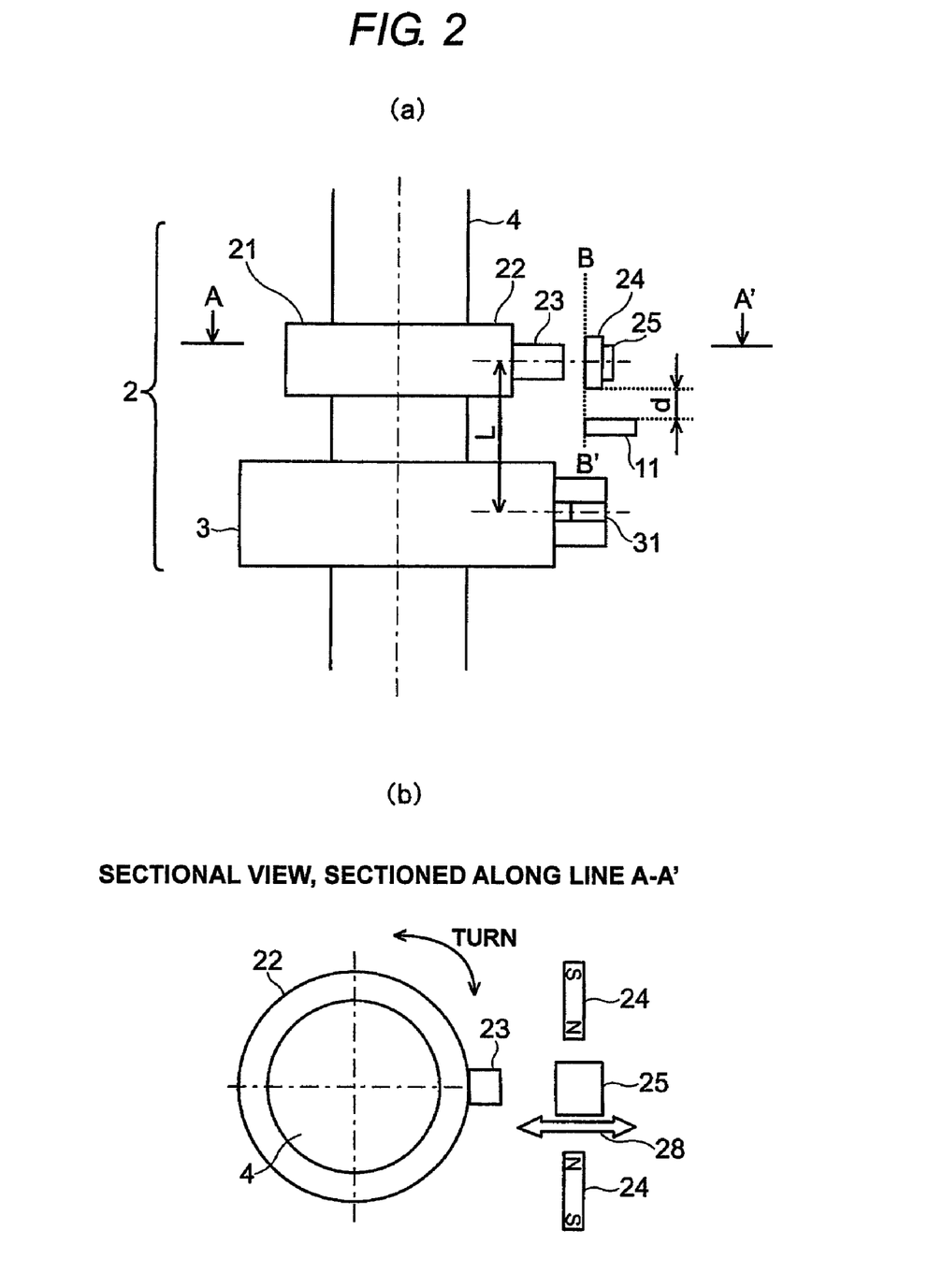
{FIG. 2} This figure shows configuration of a torque-index sensor by the present invention.

FIG. 2 shows configuration of the torque-index sensor 2. In the configuration shown in FIG. 2(a), the torque-index sensor 2 is comprised of the index sensor 21 and the torque sensor 3, wherein the index sensor 21 and the torque sensor 3 are arranged on the common axis of the steering shaft 4. The index sensor 21 is comprised of a yoke 23 provided on a collar 22 that forms an annular-shaped encoder; an index sensor magnet 24 that is a second magnet; and an index sensor Hall element 25 that is a second magnetic sensor. In the torque sensor 3, an annular-shaped first magnet is provided surrounding the steering shaft 4, and a torque sensor Hall element 31, which is a first magnetic sensor for detection of magnetic flux generated inside the torque sensor by the turn of the steering shaft 4, is arranged beside the annular-shaped first magnet. The index sensor Hall element 25 that is the second magnetic sensor and the torque sensor Hall element 31 that is the first magnetic sensor are arranged on the same side of the steering shaft 4. This style of arrangement, in which the index sensor Hall element 25 and the torque sensor Hall element 31 are disposed close mutually, improves workability in wiring from these Hall elements enabling to fabricate the torque-index sensor 2 into a compact size.

FIG. 2(*b*) shows a cross-sectional view sectioned along A-A' line as shown in FIG. 2(*a*) to show a radial-wise arrangement of the index sensor 21 in an embodiment of the present invention. As shown in FIG. 2(*b*), the index sensor 21 is comprised of the yoke 23, the index sensor Hall element 25 that is the second magnetic sensor, and the index sensor magnet 24 that is the second magnet. The yoke 23 is provided on the collar 22 that is installed on the steering shaft 4 to form the annular-shaped encoder. The steering shaft 4 and the collar 22 are joined each other so as to turn together. Therefore, the yoke 23 turns together with the steering shaft 4 and the collar 22. In a position beside the yoke 23 in the reference state, which is a state in which the steering shaft 4 has not turned, in other words, in a position beside the annular-shaped encoder, the index sensor Hall element 25 is provided so that the element sits on the extension of an axis line that connects the center axis of the steering shaft 4 and the yoke 23 in the reference state in such an orientation that magnetic flux detecting direction 28 of the element is parallel to the axis line. Further, two index sensor magnets 24 are provided on a line perpendicular to the axis line in an arrangement close to the index sensor Hall element 25. Both the two index sensor magnets 24 are installed on the line perpendicular to the axis line, which connects the center axis of the steering shaft 4 and the yoke 23 in the reference state, in a symmetrical configuration in terms of their magnetic poles with such an orientation that one end of the magnet closer to the index sensor Hall element 25 will be N-pole of the magnet and the other end S-pole.

With this configuration, the magnetic flux generated from the index sensor magnet 24 is attracted into the yoke 23 when the yoke 23 is in the closest position to the index sensor Hall element 25. Accordingly, the magnetic flux is marshaled into a unified same direction as the direction of flux detection 28 orients; therefore, an increased output appears on the index sensor Hall element 25 under the reference state. When in contrast the yoke 23 shifts from the reference position due to the turn of the steering shaft 4, the magnetic flux generated from the index sensor magnet 24 is directed to a direction perpendicular to the magnetic flux detecting direction 28 resulting in a decreased output from the index sensor Hall element 25. Thus with this configuration, the turn of the steering shaft 4 produces a large variation in the magnetic flux density. Accordingly, the accuracy of the detection of the reference position of turn of the steering shaft 4 and the stability of the index sensor 21 are enhanced.

With the configuration stated above, the turn of the steering shaft 4 causes the index sensor 21 to detect the number of turns of the steering shaft 4 and also causes the torque sensor 3 to detect the variation of the magnetic flux. The variation of the magnetic flux detected by the torque sensor 3 is transmitted to a steering control unit 6 shown in FIG. 1. The steering control unit 6 detects steering torque based on the received variation of the magnetic flux and sends a signal to the motor 5, shown in FIG. 1, to cause generation of steering assisting power according to the detected steering torque. On receipt of the signal transmitted from the steering control unit 6, the motor 5 starts to rotate for generating required steering assisting power to give the steering shaft 4 the steering assisting power. In this performance, the motor 5 returns its rotational angle to the steering control unit 6 in a signal expressed in the relative angle. On receipt of the relative angle signal from the motor 5, the steering control unit 6 detects the heading of a wheel 19 in the absolute angle obtained by means of combining the received signal with the number of turns of the steering shaft 4 detected by the index sensor 21 to use in various schemes in the vehicle control.

In the torque-index sensor 2 shown in FIG. 2, a plate-shaped magnetic plate 11 made of magnetic material as a means for varying the magnetic flux is provided between the index sensor 21 and the torque sensor 3. In this mode of implementation, the magnetic plate 11 is a rectangular solid having a length of 40 mm, a width of 5 mm, and a thickness of 0.85 mm and the material is SPCC (Cold-reduced carbon steel sheets and strips to JIS G 3141, Commercial quality). The magnetic plate 11 should preferably have a relative magnetic permeability of not smaller than 1000.

The magnetic plate 11 is arranged in such a position that the longer part of the rectangular solid shape is perpendicular to the direction that runs from the index sensor 21 toward the torque sensor 3. In this arrangement, the index sensor magnet 24 and the magnetic plate 11 are positioned so that the radial distances from the center axis of the steering shaft 4 respectively to each of the end faces of them on the steering shaft 4 side will be same, as the broken line B-B' in FIG. 2(*a*) shows.

In this mode of implementation as shown in FIG. 2(*a*), the distance L for the center to center distance between the index sensor 21 and the torque sensor 3 is 13.5 mm and the distance d between the magnetic plate 11 and the index sensor magnet 24 is 2 mm.

However, it is to be understood that the present invention is not limited in its implementation to the above-stated modes and may be practiced freely in various modifications within such an extent that the magnetic flux generated from the index sensor magnet does not interfere the magnetic sensor in the torque sensor or that the magnetic plate itself does not affect the magnetic sensor in the index sensor.

Figure 3:
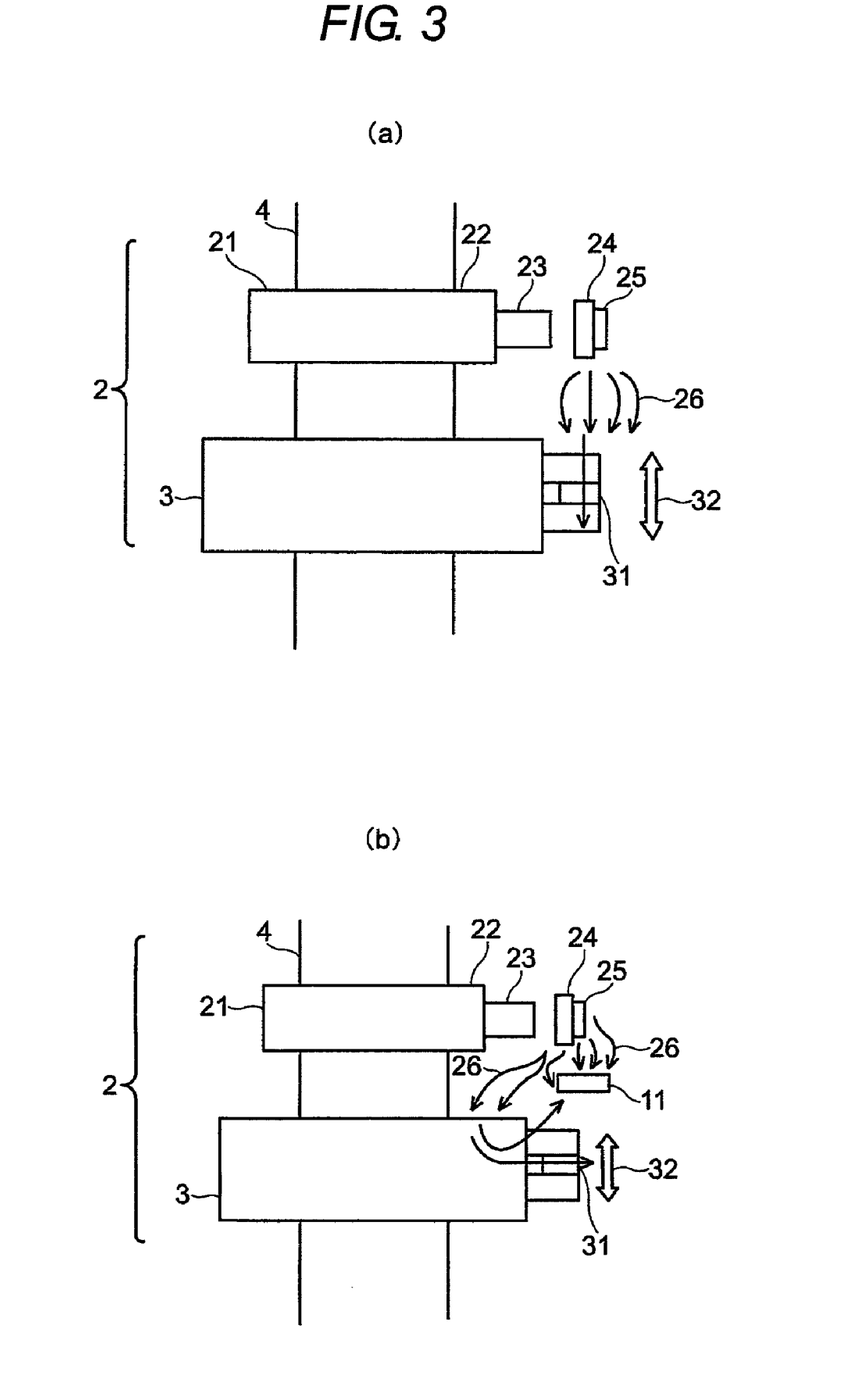
{FIG. 3} This figure shows function of a torque-index sensor by the present invention.

FIG. 3 shows the function of the present invention. FIG. 3(*a*) shows an aspect wherein the magnetic plate 11, which is a means for varying magnetic flux, is not provided and FIG. 3(*b*) the magnetic plate 11 is provided. As shown in FIG. 3(*a*), magnetic flux 26 is always generated from the index sensor magnet 24 because of the fundamental construction of the index sensor 21. Therefore, the magnetic flux 26 reaches the torque sensor Hall element 31 when the magnetic plate 11 is not provided. Since the direction of the magnetic flux 26 reaching the torque sensor Hall element 31 is same as a magnetic flux detecting direction 32 of the torque sensor Hall element 31, the magnetic flux 26 generated from the index sensor magnet 24 interferes detection of the magnetic flux by the torque sensor Hall element 31. This results in a lowered detection accuracy of the torque sensor 3. In a mode of implementation of the present invention shown in FIG. 3(*b*) in contrast, the magnetic flux 26 generated from the index sensor magnet 24 is deflected by the magnetic plate 11 before reaching the torque sensor Hall element 31 because the magnetic plate 11 is positioned between the index sensor 21 and the torque sensor 3. Therefore, a part of the magnetic flux 26 generated from the index sensor magneto 24 cannot reach the torque sensor Hall element 31. Further as shown in FIG. 3(*b*), the magnetic flux 26 reached the torque sensor 3 is deflected toward the magnetic plate 11 after reaching the torque sensor 3. Thus, the direction the magnetic flux 26 generated from the index sensor magnet 24 is turned by the magnetic plate 11 to a direction different from the magnetic flux detecting direction 32 of the torque sensor Hall element 31, that is, to such a direction as is perpendicular to the magnetic flux detecting direction 32. Because of this effect, the interference by the magnetic flux 26 generated from the index sensor magnet 24 over the torque sensor Hall element 31 can be prevented.

Thereby, a close arrangement of the index sensor 21 to the torque sensor 3 for integrating them into the torque-index sensor 2 becomes practicable.

Examples

Figure 4:
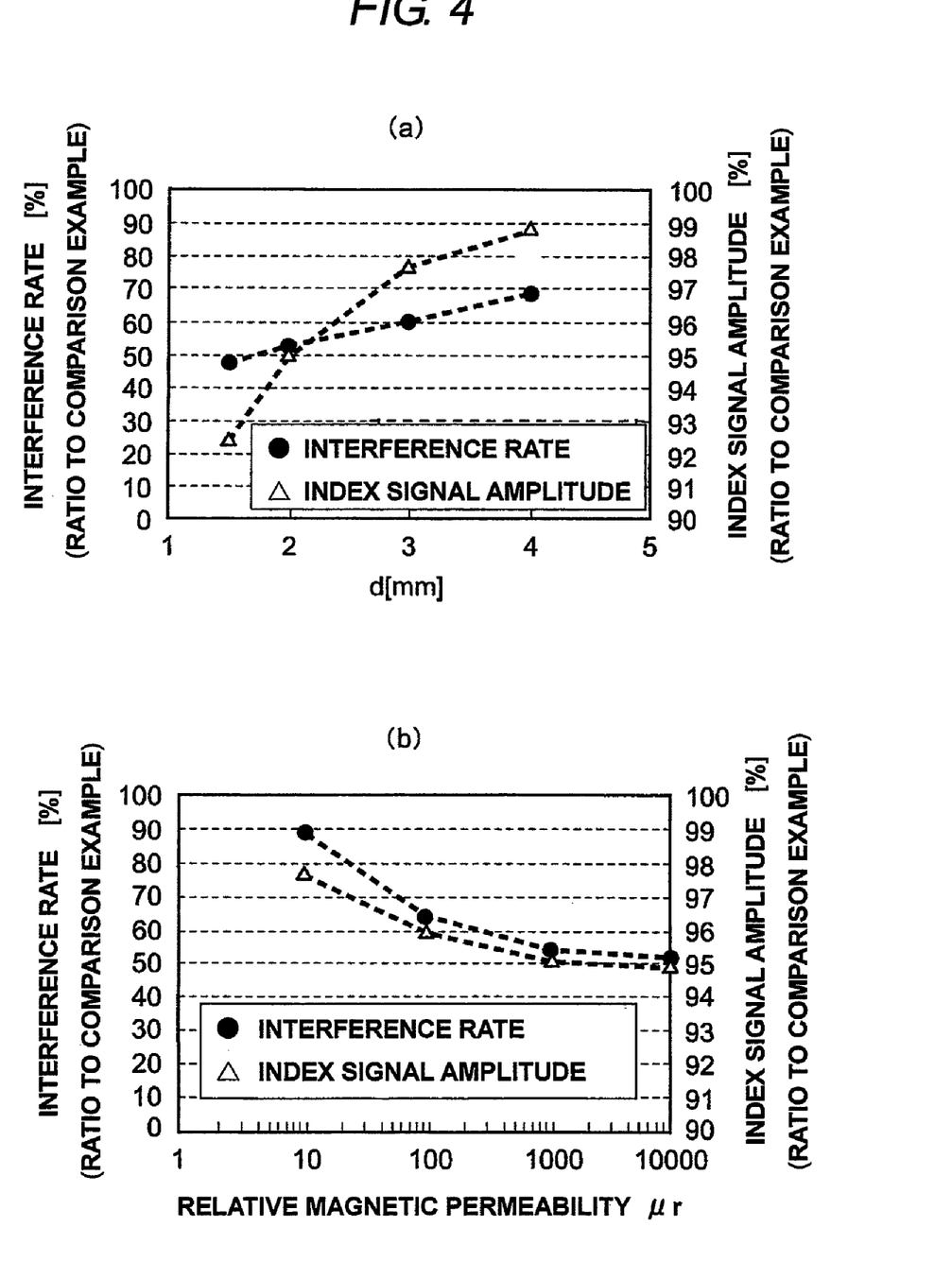
{FIG. 4} This figure shows effect of a torque-index sensor by the present invention.

Embodiment examples are shown in FIG. 4. FIG. 4(a) shows a relationship between the interference rate and the index signal amplitude when the distance d between the magnetic plate 11 and the index sensor magnet 24 is changed into four distances of 1.5 mm, 2 mm, 3 mm, and 4 mm in terms of measurement from the end face of the index sensor magnet 24 on the magnetic plate 11 side with the dimensions and the relative magnetic permeability of the magnetic plate 11 kept constant. In this arrangement, the center to center distance between the index sensor 21 and the torque sensor 3 is 13.5 mm and the index sensor magnet 24 and the magnetic plate 11 are positioned so that the radial distances from the center axis of the steering shaft 4 respectively to each of the end faces of them on the steering shaft 4 side will be same. FIG. 4(b) shows a relationship between the interference rate and the index signal amplitude when the distance d between the magnetic plate 11 and the index sensor magnet 24 is kept at a constant value of 2 mm with the magnetic permeability of the magnetic plate 11 being changed into four values of 10, 100, 1000, and 10000. In this arrangement, the center to center distance L between the index sensor 21 and the torque sensor 3 and the radial-wise locational relation of the index sensor magnet 24 and the magnetic plate 11 with respect to the steering shaft 4 are same as those in the configuration shown in FIG. 4(a).

The interference rate expressed in FIGS. 4(a) and 4(b) is a rate to indicate degree of disturbance over the torque sensor Hall element 31 caused by interference. The rate is expressed as a percentage of the output voltages of the torque sensor 3 in embodiments severally to the output voltages of the same but the magnetic plate 11 is not installed as shown in FIG. 3(a) with the definition of this voltage being 100. Where this rate is low, the interference by the index sensor 21 over the torque sensor Hall element 31 is judged weak. The index signal amplitude is a rate to indicate degree of decrease in the output of the index sensor Hall element 25. Similarly to the above, the rate is expressed as a percentage of the output voltages of the index sensor 21 in embodiments severally to the output voltages of the same but the magnetic plate 11 is not installed with the definition of this voltage being 100. Where this rate is high, the interference by the magnetic plate 11 over the index sensor 21 is judged weak.

In the arrangement shown in FIG. 4(a), when the distance d between the magnetic plate 11 and the index sensor magnet 24 is changed into four distances of 1.5 mm, 2 mm, 3 mm, and 4 mm in terms of measurement from the end face of the index sensor magnet 24 on the magnetic plate 11 side, the interference rate over the torque sensor Hall element 31 weakens as the distance decreases; and where the distance d is 2 mm, the interference rate weakens as low as 47% compared with the case without the magnetic plate 11. In contrast, although the output of the index sensor Hall element 25 decreases as the distance d decreases, the decreasing rate was 4.9% when the distance d was 2 mm. From these, it is preferable in implementing the present invention to make the distance d between the index sensor magnet 24 and the magnetic plate to be 2 mm. It should be understood that the characteristics of the torque sensor 3 and the index sensor 21 vary depending on temperatures although the interference rate and the index signal amplitude of these embodiments shown above are those at the room temperature (20° C.). The characteristics of the torque sensor 3 and the index sensor 21 also vary to some extent depending on manufacturing reason such as errors. It is therefore preferable to determine that the distance d between the index sensor magnet 24 and the magnetic plate 11 is within 2 mm±0.5 mm.

In the arrangement shown in FIG. 4(b), when the distance d between the magnetic plate 11 and the index sensor magnet 24 is kept at a constant value with the magnetic permeability of the magnetic plate 11 being changed into four values of 10, 100, 1000, and 10000, it was observed that the interference rate and the index signal amplitude showed a tendency that their variation were not so sharp where the μr was 1000 or more. From these, it will be found that it is preferable in implementing the present invention to make relative magnetic permeability μr of the magnetic plate 11 to be 1000 or more.

As stated above, the present invention lightens the interference over the torque sensor due to the magnetic flux generated from the index sensor permitting a close arrangement of the index sensor and the torque sensor to realize the integration of the index sensor and the torque sensor into a torque-index sensor.

The torque-index sensor by the present invention enables fabrication of the index sensor and the torque sensor integrally into the power steering device. This therefore permits an efficient fabrication of an index sensor, which is able to bring advantages of reduction of number of parts, simplification of fabrication process, cutting of manufacturing cost, and miniaturization of the device, into a power steering device.

The invention claimed is:

1. A torque-index sensor, comprising:
a torque sensor that includes a first magnetic sensor arranged beside a first annular-shaped magnet, and an index sensor that includes a second magnet and a second magnetic sensor both arranged beside an annular-shaped encoder,
wherein said torque sensor and said index sensor are arranged in line on a common axis; and a means for varying magnetic flux, which changes direction of magnetic flux that is generated from said second magnet toward said first magnetic sensor, arranged between said first magnetic sensor in said torque sensor and said second magnet in said index sensor.

2. The torque-index sensor according to claim 1, wherein said means for varying magnetic flux is a plate-shaped member made of magnetic material.

3. The torque-index sensor according to claim 1, wherein said means for varying magnetic flux is a plate-shaped member made of magnetic material of which relative magnetic permeability is not smaller than 1000.

4. The torque-index sensor according to claim 1, wherein the distance between said second magnet and said means for varying magnetic flux is within the range of 2.0 mm±0.5 mm.

5. The torque-index sensor according to claim 2, wherein the distance between said second magnet and said means for varying magnetic flux is within the range of 2.0 mm±0.5 mm.

6. The torque-index sensor according to claim 3, wherein the distance between said second magnet and said means for varying magnetic flux is within the range of 2.0 mm±0.5 mm.

* * * * *